Sept. 11, 1951          J. M. LOEB          2,567,647
APPARATUS MATERIALIZING THE PATHS OF ELECTRIFIED
PARTICLES MOVING INSIDE A MAGNETIC FIELD
Filed March 12, 1947

Patented Sept. 11, 1951

2,567,647

UNITED STATES PATENT OFFICE 2,567,647

APPARATUS MATERIALIZING THE PATHS OF ELECTRIFIED PARTICLES MOVING INSIDE A MAGNETIC FIELD

Julien Maurice Loeb, Clamart, France

Application March 12, 1947, Serial No. 734,194
In France November 14, 1945

Section 1, Public Law 690, August 8, 1946
Patent expires November 14, 1965

5 Claims. (Cl. 175—183)

The invention has for its object an apparatus adapted to establish and record the trajectories of electrified particles moving in a magnetic field.

The invention relies on the following principle: a conductive wire placed in any magnetic field, fed with direct current of intensity I and under a tension T, assumed a shape identical with the trajectory of an electrified particle, having a mass $m$, a speed $v$, and an electric charge $e$, provided these values are related by the formula:

(1) $$T=\frac{Imv}{e}$$

In this formula, $m$ is the moving mass of the particles, $$m=\frac{m_0}{1-\frac{v^2}{c^2}}$$

where $m_0$ is the value of the mass at rest and $c$ the speed of light in vacuo.

The Formula 1 is obtained by equalizing the radii of curvature corresponding, respectively, to the wire and to the trajectory considered. It is valid provided the stiffness and weight of the wire are considered negligible.

The invention is a practical embodiment of the above principle and consists in arranging in a magnetic field, identical with that in which it is desired to ascertain the trajectories of the electrified particles, a wire fed by an adjustable direct current and subjected to an adjustable and measurable tension.

Under such conditions, the shape of the trajectory followed by the particles is assumed by the wire, the shape of which may be recorded by any means known in the arts of photographing, descriptive geometry, and the like.

One embodiment of the invention is illustrated in the accompanying drawing.

Figure 1:
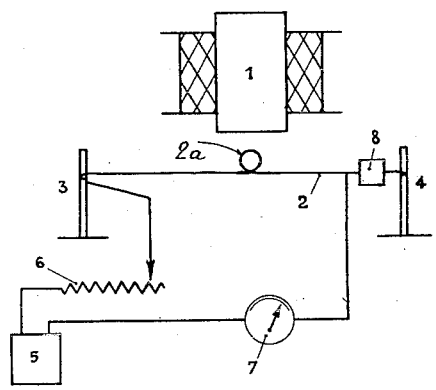
Fig. 1 is a schematic view illustrating one embodiment of this invention.

In Fig. 1 the electromagnet 1 is adapted to produce the magnetic field in which it is desired to study the movements of the electrified particles; a copper wire 2, which may have a diameter of $4/100$ of a millimeter, is secured between supports 3 and 4 and fed by a battery 5 through a rheostat 6 and an ammeter 7. Under the action of the field of the electromagnet 1, the wire assumes the shape of the trajectory followed by an electrified particle advancing at a speed $v$, as specified by the Formula 1, and the boundary conditions of which are determined by the positions of the wire terminals.

The loop 2a, shown in Fig. 1, illustrates the projection of the trajectory considered on the plan of the drawing.

8 designates a dynamometer adapted to measure the tension of the wire in accordance with known methods.

When the required tension corresponding to the speed contemplated is too small for accurate measurement, it is possible to multiply the magnetic field by a known factor N i. e., the wire is placed in a field which is N times more powerful.

The formula to be applied for obtaining $v$, when T is known, will then be:

(2) $$T=\frac{ImvN}{e}$$

When the physical dimensions of the field to be studied are too small or too large for allowing the apparatus to be used, it is possible to apply the known principles of equivalence. The study of the actual trajectory is then replaced by that of a particle of the same speed and the same mass in a magnetic field, all the linear dimensions of which are multiplied by the same number M, while its intensity is divided by said number M.

The two above remarks relating, respectively, to an increase in the magnetic field and to the use of homologous systems allows enlarging the field of application of the apparatus forming the object of the invention.

Figure 2:
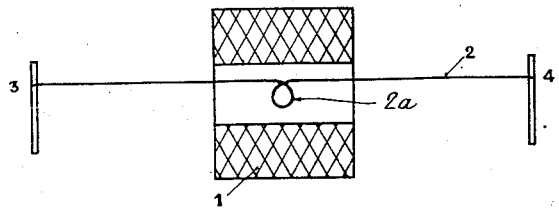
Fig. 2 is a schematic view illustrating one of the possible applications of the apparatus.

A first possible application of the apparatus resides in the study of lenses based on the displacement of electrified particles in a magnetic field, as is the case in electronic lenses of the magnetic type (Fig. 2).

A lens 1, the linear dimensions of which are N times larger than those of the lens to be studied, creates a magnetic field in which the wire 2 is located between the supports 3 and 4. For sake of greater clearness, Fig. 2 does not illustrate the means feeding said wire nor the dynamometer which are identical with the similar devices shown in Fig. 1.

This arrangement allows finding immediately the image point 3 corresponding to object point 4. As a matter of fact, it is known that, when two points form the image of one another in the apparatus, there exists an infinity of possible trajectories passing through both points. This condition is made apparent in the apparatus by the fact that the position of the wire becomes unstable; so that, the latter may occupy any of the positions corresponding to the possible trajectories.

A second application consists in the study of the trajectories of electrified particles in the terrestrial magnetic field.

A third application consists in the use of the apparatus for teaching purposes, to demonstrate the action of a magnetic field on moving electrical charges.

These three applications are given merely by way of example and by no means in a limitative sense.

What I claim is:

1. An apparatus for establishing and recording the trajectory of electrified particles in a magnetic field comprising in combination means for producing a magnetic field identical with that wherein it is desired to ascertain the paths of electrified particles; a wire having a negligible weight and stiffness and arranged in the magnetic field and put under tension within the magnetic field; means for connecting said wire with a source of direct current; means for regulating the current passing through said wire; and means for regulating the mechanical tension imposed on said wire whereby the radius of curvature assumed by the wire will indicate the radius of curvature of the trajectory of said electrified particles.

2. An apparatus for establishing and recording the trajectory of electrified particles in a magnetic field comprising in combination means for producing a magnetic field identical with that wherein it is desired to ascertain the paths of electrified particles; a wire having a negligible weight and stiffness and arranged in the magnetic field and put under tension within the magnetic field; means for connecting said wire with a source of direct current; means for regulating the current passing through said wire; means for regulating the mechanical tension imposed on said wire; and means for measuring said tension whereby the data ascertained for the radius of curvature assumed by the wire will indicate the radius of curvature of the trajectory of said electrified particles.

3. An apparatus for establishing and recording the trajectory of electrified particles in a magnetic field comprising in combination means for producing a magnetic field identical with that wherein it is desired to ascertain the paths of electrified particles; a wire having a negligible weight and stiffness and arranged in the magnetic field and put under tension within the magnetic field; means for connecting said wire with a source of direct current; means for regulating the current passing through said wire; and means for adjusting the mechanical tension imposed on said wire in a manner that the ratio of said tension to the strength of said current is equal to $$\frac{mv}{e}$$

wherein $m$ is the mass of an electrified particle, $v$ its speed, and $e$ the electrical charge.

4. An apparatus for establishing and recording the trajectory of electrified particles in a magnetic field comprising in combination means for producing a magnetic field having a strength of said magnetic field being a multiple of that of the field wherein it is desired to ascertain the paths of electrified particles; a wire having a negligible weight and stiffness and arranged in the magnetic field and put under tension within the magnetic field; means for connecting said wire to a source of direct current; and means for regulating the current passing through said wire whereby the radius of curvature assumed by the wire will correspond to the radius of curvature of the trajectory of said electrified particles.

5. An apparatus for establishing and recording the trajectory of electrified particles in a magnetic field comprising means for producing a magnetic field having a strength of said magnetic field being a multiple of that of the field wherein it is desired to ascertain the paths of electrified particles; a wire having a negligible weight and stiffness and arranged in the magnetic field and put under tension within the magnetic field; means for connecting said wire to a source of direct current; means for regulating the current passing through said wire; and means for regulating the tension imposed on said wire whereby the radius of curvature assumed by the wire will correspond to the radius of curvature of the trajectory of said electrified particles.

JULIEN MAURICE LOEB.

REFERENCES CITED

The following references are of record in the file of this patent:

UNITED STATES PATENTS

| Number | Name | Date |
|---|---|---|
| 1,863,415 | Rieber | June 14, 1932 |
| 1,906,271 | Jakosky | May 2, 1933 |